(12) United States Patent
Wirtanen et al.

(10) Patent No.: US 8,792,451 B2
(45) Date of Patent: Jul. 29, 2014

(54) METHOD IN A MOBILE DEVICE FOR NETWORK SELECTION TO PROVIDE AN ENHANCED NUMBER OF IP SESSIONS

(75) Inventors: Jeffrey William Wirtanen, Kanata (CA); Muhammad Khaledul Islam, Kanata (CA)

(73) Assignee: Blackberry Limited, Waterloo, Ontario (CA)

( * ) Notice: Subject to any disclaimer, the term of this patent is extended or adjusted under 35 U.S.C. 154(b) by 435 days.

(21) Appl. No.: 12/944,064

(22) Filed: Nov. 11, 2010

(65) Prior Publication Data

US 2012/0120913 A1 May 17, 2012

(51) Int. Cl.
*H04W 4/00* (2009.01)
*H04W 36/18* (2009.01)
*H04W 36/00* (2009.01)

(52) U.S. Cl.
CPC .......... *H04W 36/18* (2013.01); *H04W 36/0011* (2013.01)
USPC ...... 370/331; 455/432.1; 455/433; 455/435.1

(58) Field of Classification Search
None
See application file for complete search history.

(56) References Cited

U.S. PATENT DOCUMENTS

| | | | |
|---|---|---|---|
| 2007/0213046 A1* | 9/2007 | Li et al. | 455/425 |
| 2008/0049741 A1 | 2/2008 | Wirtanen et al. | |
| 2008/0089304 A1* | 4/2008 | Wirtanen et al. | 370/342 |
| 2009/0034496 A1 | 2/2009 | Ko et al. | |
| 2010/0067482 A1* | 3/2010 | Vikberg et al. | 370/331 |
| 2010/0128697 A1 | 5/2010 | Choi-Grogan | |
| 2010/0216465 A1* | 8/2010 | Mubarek et al. | 455/435.1 |
| 2012/0151030 A1* | 6/2012 | Guttman et al. | 709/223 |

FOREIGN PATENT DOCUMENTS

| | | |
|---|---|---|
| WO | 2007144029 A1 | 12/2007 |
| WO | 2008137376 A2 | 11/2008 |

* cited by examiner

*Primary Examiner* — Ian N Moore
*Assistant Examiner* — Latresa McCallum

(57) ABSTRACT

A method in a mobile device is provided. The method includes storing the number of IP (Internet protocol) sessions available to the mobile device for each of a number of network areas; and when the mobile device is in a location where two of the network areas overlap, performing cell selection based on the stored number of IP sessions for each of the overlapping network areas.

19 Claims, 8 Drawing Sheets

| Network Region IDs | Number of PDP Contexts Supported |
|---|---|
| <network ID> | <number of contexts> |
| PLMN Identifier | <number of contexts> |
| PLMN Identifier and LAC | <number of contexts> |
| RAC and RNC ID | <number of contexts> |
| PLMN Identifier, LAC and Cell ID | <number of contexts> | on
METHOD IN A MOBILE DEVICE FOR NETWORK SELECTION TO PROVIDE AN ENHANCED NUMBER OF IP SESSIONS

FIELD OF THE APPLICATION

The application relates to wireless communication, and more particularly to IP (Internet Protocol) sessions.

BACKGROUND

Communications between a mobile device and a corresponding node are processed in a UMTS (Universal Mobile Telecommunications System) network through GPRS (General Packet Radio Service) serving nodes. The GPRS serving nodes include an SGSN (Serving GPRS Support Node) and a GGSN (Gateway GPRS Support Node). Such communication exchange between the mobile device and the corresponding node involve communication exchange between the mobile device and the SGSN. Communication exchanges such as user plane communication (i.e. IP data traffic) between the mobile device and the SGSN node use one or more PDP (Packet Data Protocol) contexts. There may be many PDP contexts depending on how many different applications of the mobile device are communicating over PDP contexts. Typically each primary PDP context is associated with an IP address. So if an application on the mobile device requires an IP address, a PDP context needs to be set up. However, the number of concurrent PDP contexts for the mobile device may be limited by the number of concurrent PDP contexts supported in the routing area in which the mobile device resides.

If more services using a PDP context are requested by the user than are supported by the network then there may be some sort of multiplexing by virtue of which some services are delayed, etc.

BRIEF DESCRIPTION OF THE DRAWINGS

Embodiments will now be described with reference to the attached drawings in which.

DETAILED DESCRIPTION OF EMBODIMENTS

Figure 1A:
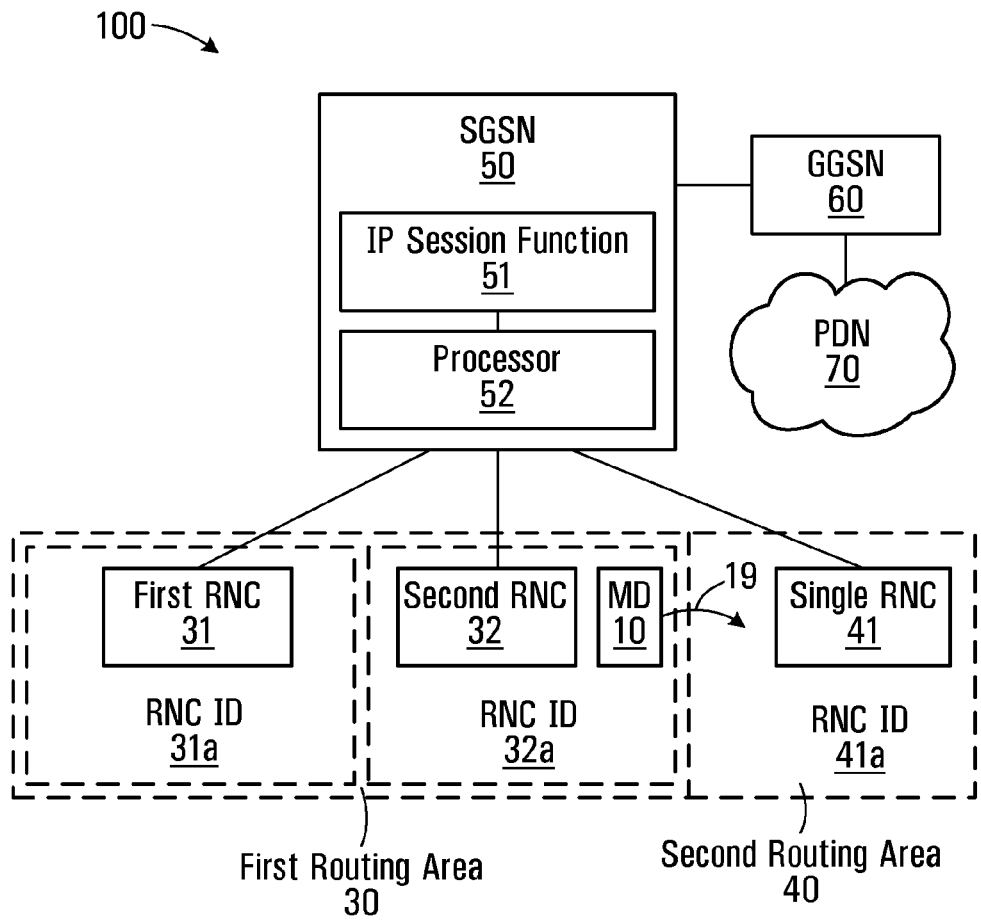
FIG. 1A is a block diagram of an example wireless network and a mobile device.

Different routing areas in a UMTS network may support different numbers of concurrent PDP contexts. Some routing areas in UMTS networks only support one PDP context. In such cases, in order to utilize an additional service, a currently active PDP context utilized by one service must first be deactivated so that the additional service can activate its PDP context. Furthermore, in some UMTS networks there are overlay situations where cells with different LACs (location area codes) overlap and the cells support different numbers of concurrent PDP contexts, as is commonly the case when Femto and Macro cells exist in an overlay manner. A femtocell is a low-power wireless access point that operates in licensed spectrum and connects mobile devices to a wireless network using a broadband Internet connection. Femtocells are typically overlaid by one or more macro cells and serve a significantly smaller geographic area or subscriber constituency than a macro cell. Conventional network selection/reselection criteria may force a mobile device to select or reselect a cell capable of supporting a lesser number of concurrent PDP contexts, which can undesirably limit the number of simultaneous PDP contexts available to the mobile device which in turn may reduce the number of concurrent active applications.

In the case of network re-selection, this can potentially force the mobile device to de-activate one or more of its active PDP contexts if the cell to which the mobile device is pushed by virtue of conventional network re-selection criteria is incapable of supporting the mobile device's currently number of active PDP contexts even if another cell (e.g. the source cell) is available that can support the required number of concurrent PDP context.

According to one broad aspect, there is provided method in a mobile device comprising: storing the number of IP (Internet protocol) sessions available to the mobile device for each of a number of network areas; and when the mobile device is in a location where two of the network areas overlap, performing cell selection based on the stored number of IP sessions for each of the overlapping network areas.

In some embodiments storing the number of IP sessions available to the mobile device for each of a number of network areas comprises maintaining a history of a respective number of concurrent IP sessions supported by a number of previously visited network areas.

In some embodiments performing cell selection comprises preferentially selecting a cell within one of the overlapping network areas that the stored number of IP sessions available to the mobile device for each of the overlapping network areas indicates is capable of supporting a higher number of concurrent IP sessions.

In some embodiments, the method further comprises: upon an event triggering cell selection, identifying a candidate set of available cells having regard to an RF (Radio Frequency) signal parameter criteria, wherein cell selection is performed having regard to the RF signal parameter associated with an available cell in the candidate set of available cells and the stored number of IP sessions available to the mobile device for the network area in which the available cell is located.

In some embodiments, the method further comprises triggering cell selection upon receiving a request from an application for establishing a new IP session that would exceed the maximum number of concurrent IP sessions capable of being supported by a currently serving cell.

In some embodiments, the method further comprises triggering cell selection upon start-up of the mobile device.

In some embodiments, for a given network area, maintaining a history of a number of concurrent IP sessions supported by the given network area comprises: attempting to establish simultaneous IP sessions with the given network area; receiving responses to such attempts; and determining a number of concurrent IP sessions supported by the given network area on the basis of the attempts to establish IP sessions and the responses to such attempts.

In some embodiments, for a given network area for which the number of IP sessions available to the mobile device has not been determined, assuming a default value for the number of IP sessions available to the mobile device for the given network area based on a maximum number of concurrent IP session that the mobile device is capable of supporting.

In some embodiments, storing the number of IP sessions available to the mobile device for each of a number of network areas comprises maintaining a history of a respective number of concurrent PDP (Packet Data Protocol) contexts supported by previously visited network areas.

In some embodiments, the stored number of IP sessions available to the mobile device for each of a number of network areas identifies the network areas to a granularity of at least one of: PLMN (Public Land Mobile Network) identifier; PLMN identifier and LAC (location area code); RAC (Routing Area Code) and RNC ID (Radio Network Controller Identifier); PLMN identifier, LAC and Cell ID; sets of cells; and individual cells.

In some embodiments, performing cell selection comprises determining, based on the stored number of IP sessions available to the mobile device for each of the overlapping network areas, if a greater number of IP sessions is available to the mobile device in an available cell than in a currently serving cell, and if so, selecting the available cell as a new serving cell.

According to another broad aspect, there is provided a mobile device comprising: at least one antenna; a wireless access radio functionally connected to the at least one antenna; a memory for storing a number of IP sessions available to the mobile device for each of a number of network areas; a cell selection function functionally connected to the memory, the cell selection function configured to: when the mobile device is in a location where two of the network areas overlap, perform cell selection based on the stored number of IP sessions for each of the overlapping network areas.

In some embodiments, the cell selection function is configured to store the number of IP sessions available to the mobile device for each of a number of network areas in the memory by maintaining a history in the memory of a respective number of concurrent IP sessions supported by a number of previously visited network areas.

In some embodiments, the cell selection function is configured to preferentially select a cell within one of the overlapping network areas that the stored number of IP sessions for each of the overlapping network areas indicates is capable of supporting a higher number of concurrent IP sessions.

In some embodiments, upon an event triggering cell selection, the cell selection function is configured to: identify a candidate set of available cells based on an RF (Radio Frequency) signal parameter criteria; and perform cell selection having regard to, for each of at least one cell in the candidate set, an RF signal parameter of the cell and the stored number of IP sessions available to the mobile device for the network area in which the cell is located.

In some embodiments, the cell selection function is configured to perform cell selection upon acceptance of a request from an application for establishing a new IP session that would exceed the maximum number of IP sessions available to the mobile device by a current serving cell.

In some embodiments, the cell selection function is configured to perform cell selection at start-up of the mobile device.

In some embodiments, the cell selection function is configured to maintain a history of a number of concurrent IP sessions supported by a given network area in the memory by: attempting to establish simultaneous IP sessions with the given network area; receiving responses to such attempts; determining a number of concurrent IP sessions supported by the given network area on the basis of the attempts to establish IP sessions and the responses to such attempts; and storing the determined number of concurrent IP sessions supported by the given network area in the memory.

In some embodiments, the number of IP sessions available to the mobile device for each of a number of network areas stored in the memory comprises a history of a respective number of concurrent PDP (Packet Data Protocol) contexts supported by previously visited network areas.

In some embodiments, the number of IP sessions available to the mobile device for each of a number of network areas stored in the memory of the mobile device identifies the network areas to a granularity of at least one of: PLMN (Public Land Mobile Network) identifier; PLMN identifier and LAC (Location Area Code); RAC (Routing Area Code) and RNC ID (Radio Network Controller Identifier); PLMN identifier, LAC and Cell ID; sets of cells; and individual cells.

In some embodiments, the cell selection function is further configured to: determine, based on the number of IP sessions available to the mobile device for each of the overlapping network areas stored in the memory of the mobile device, if a greater number of IP sessions is available to the mobile device in an available cell than in a currently serving cell; and if so, select the available cell as a new serving cell.

According to yet another broad aspect, there is provided a computer readable medium having computer executable instructions stored thereon for execution on a mobile device so as to implement a method as described herein.

Wireless Communication System

Referring now to FIG. 1A, shown is a block diagram of an example wireless network 100 and a mobile device 10. The wireless network 100 has a first routing area 30 and a second routing area 40. Routing areas are identified by a routing area identification (RAI) that contains a location area identification (LAI) and a routing area code (RAC). The RAC uniquely identifies a routing area within the location area identified by the LAI. LAI contains a public land mobile network (PLMN) code and a location area code (LAC). The LAC uniquely identifies a location area within the PLMN identified by the PLMN code. In some cases, the PLMN code contains a mobile country code (MCC) and a mobile network code (MNC). The MNC uniquely identifies the mobile network within a country identified by the MCC. There may be other routing areas, but they are not shown for simplicity. Each routing area has at least one RNC (Radio Network Controller). In the illustrated example, the first routing area 30 has a first RNC 31 and a second RNC 32 while the second routing area 40 has a single RNC 41. Each RNC 31,32,41 is associated with a respective RNC ID. The first RNC 31 and the second RNC 32 of the first routing area 30 have an RNC ID 31*a* and an RNC ID 32*a*, respectively, while the single RNC 41 of the second routing area 40 has an RNC ID 41*a*. Each cell (not shown) associated with an RNC (via a Node B) is associated with a RAI (Routing Area Identification) corresponding to the routing area in which the cell resides. In some cases, each cell is associated with a cell identifier (CI) that uniquely identifies the cell within a routing area. Each RNC controls a respective set of one or more base stations (or node Bs) or access points. Each basestation/access point (not shown) provides coverage to a coverage area referred to herein as a cell. An RAI may include one or more cells and span across RNCs. For example, in the example illustrated in FIG. 1A, the RAI corresponding to the first routing area 30 spans across the first and second RNCs 31,32. In some implementations, each RAI is a combination of a mobile country code (MCC), a mobile network code (MNC), a location area code (LAC) and a RAC (routing area code).

In the illustrated example, each RNC 31,32,41 is coupled to an SGSN (Serving General Packet Radio Service Support Node) 50, which in turn is coupled to a GGSN (Gateway GPRS Support Node) 60, which in turn is coupled to a PDN (Packet Data Network) 70. The PDN 70 may for example be an Internet. The SGSN 50 has an IP session function 51 coupled to a processor 52 and may have other components, but they are not shown for simplicity.

Figure 1B:
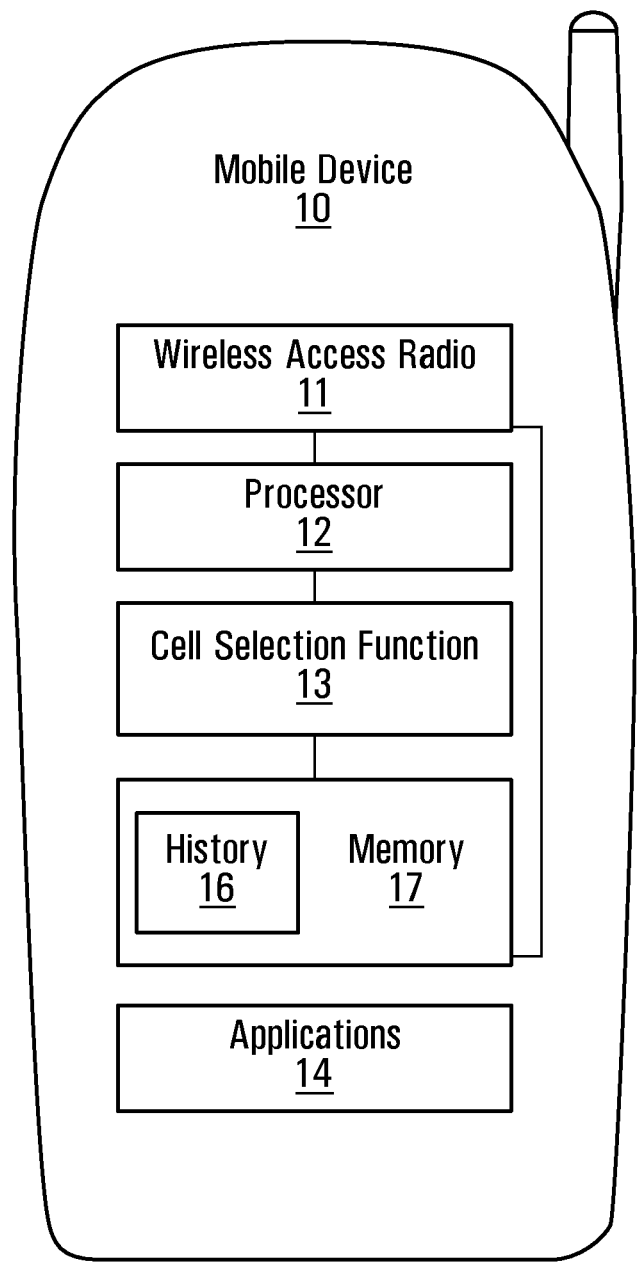
FIG. 1B is a block diagram of the mobile device shown in FIG. 1A.

The wireless network 100 is shown with a single mobile device, namely the mobile device 10. There may be other mobile devices, but they are not shown for simplicity. With reference to FIG. 1B, shown is a block diagram of the mobile device 10 shown in FIG. 1A. The mobile device 10 has a processor 12, which is functionally connected to a wireless access radio 11, a cell selection function 13 and applications 14. The cell selection function 13 is functionally connected to a memory 17 in which a history 16 of a number of supported IP sessions is stored. The mobile device 10 may have other components, but they are not shown for sake of simplicity. With reference back to FIG. 1A, the mobile device 10 is currently positioned within the first routing area 31. However, the mobile device 10 may move to another routing area such as the second routing area 40 as indicated by a moving arrow 19.

In operation, the mobile device 10 is adapted to communicate with the wireless network 100 using its wireless access radio 11. Such communication may for example be voice communication, electronic messaging, and any other appropriate form of communication supported by the applications 14. At least some communication with the wireless network 100 is over one or more IP sessions between the mobile device 10 and the SGSN 50. A PDP (Packet Data Protocol) session is an example of an IP session. There may be many IP sessions between the mobile device 10 and the SGSN 50 depending on how many of the applications 14 have established a unique IP session. In some cases, two applications may share the same IP session or PDP context. However, the number of concurrent IP sessions is typically limited by the number of concurrent PDP contexts supported in the routing area in which the mobile device 10 resides, which is currently the first routing area 30.

There are instances when the mobile device 10 transmits a request of a type that, if granted, would result in an increase in the number of established IP sessions, such as an Activate IP Session Request or an IP Session Service Request. The wireless network 100 receives the request and determines whether there is a maximum number of IP sessions already established for the mobile device 10. According to an embodiment of the application, the IP session function 51 implements a method in the wireless network 100 by which, in the event that the maximum number of IP sessions is already established for the mobile device 10, the wireless network 100 transmits a response indicating that the request cannot be fulfilled, from which response the mobile device is able to directly determine, or infer, depending on the type of request/response, that a maximum number of concurrent IP sessions is already established. By storing a history of the number of IP sessions that can be supported by previously visited network areas the mobile device is able to perform cell selection from a candidate set of available cells having regard to the number of IP sessions that can be supported by the previously visited network areas in which cells of the candidate list of cells are located. Further details are provided below with reference to FIGS. 2 through 7.

In the illustrated example, it is assumed that within a routing area the same number of IP sessions is supported for the mobile device 10 regardless of how many RNCs are present in the routing area. Typically a routing area has a single RNC, such as the case is with the second routing area 40. The number of IP sessions supported for a given mobile device is currently limited by the number of concurrent packet-switched radio access bearers supported at RNC. Therefore, while the limiting factor is actually the RNC, the routing area can equally be regarded as the limiting factor. However, a routing area might have more than one RNC, such as the case is with the first routing area 30. Therefore, it is possible for a routing area to support a different number of PDP contexts for a mobile device depending on where in the routing area the mobile device resides. In this case the routing area cannot be regarded as the limiting factor. While the examples presented herein refer to "routing areas" as limiting the number of IP sessions for a mobile device, it is to be understood that more generally an "area" of the network, referred to herein generally as a "network area", limits the number of IP sessions for the mobile device. The "network area" may be a routing area, a portion of a routing area as defined for example by an RNC ID, a network, a cell id, or any other area in which the number of IP sessions supported for a mobile device is limited.

More generally, the mobile device 10 stores the number of IP sessions available to the mobile device for each of a number of network areas and, when the mobile device is in a location where two of the network areas overlap, performs cell selection based on the stored number of IP sessions for each of the overlapping network areas. Storing a history of the number of concurrent IP sessions that can be supported by previously visited network areas is an example of the more general feature of storing the number of IP sessions available to the mobile device. By storing the number of IP sessions available to the mobile device for each of the number of network areas, the mobile device is able to, for example, perform cell selection from a candidate set of available cells based on the stored number of IP sessions that can be supported by the overlapping network areas in which cells of the candidate list of cells are located.

In some implementations, there are subtleties between the radio resource control Connected/Idle modes and different states in connected mode (CELL_DCH, CELL_FACH, CELL_PCH, and URA_PCH) for the mobile device. The routing area is known to the mobile device while in the Idle mode; however, the true RNC id may not be known if the network does not broadcast RNC Id correctly. As a result, a mobile in idle mode needs to enter the Connected/Active state in order to unambiguously determine its serving RNC id which may cause unwanted battery drain if mobile needs to perform such activities frequently. Therefore, in some implementations, the number of supported IP sessions is tracked based on routing area irrespective of whether the routing area is the lowest level of granularity.

There are many possibilities for the cell selection function 13 of the mobile device 10. In the illustrated example, the cell selection function 13 is implemented as software and is executed on the processor 12. However, more generally, the cell selection function 13 may be implemented as software executed on any appropriate processing hardware, hardware, firmware, or any appropriate combination thereof. In the illustrated example, the cell selection function 13 is shown as a single component. However, more generally, the cell selection function 13 may be implemented as one or more components. An example in which the cell selection function 13 includes more than one component is described below.

In some implementations, the cell selection function 13 includes a NAS (Non Access Stratum) and an AS (Access Stratum). The NAS includes a session management layer and manages IP sessions. The NAS may for example initiate an Activate PDP context request message to be sent to the SGSN 50. The AS manages an air interface of the wireless access radio 11 and includes a respective RAB (Radio Access Bearer) for each active IP session. An RAB is an identifier for an RF (Radio Frequency) pipe that includes physical channel resources. There may be dormant IP sessions without respective RABs. The AS may for example initiate a service request message to be sent to the RNC.

There are many possibilities for the IP session function 51 of the wireless network 100. In the illustrated example, the IP session function 51 is implemented as software and is executed on the processor 52. However, more generally, the IP session function 51 may be implemented as software executed on any appropriate processing hardware, hardware, firmware, or any appropriate combination thereof. In the illustrated example, the IP session function 51 is shown as a single component of the SGSN 50. However, more generally, the IP session function 51 may be implemented as one or more components and may be implemented as part of, or separate from, the SGSN 50. The one or more components may be distributed throughout the wireless network 100, or reside in a common location. Other implementations are possible.

There are many possibilities for the wireless network 100. In the illustrated example, the wireless network 100 is a UMTS (Universal Mobile Telecommunications System) network. However, more generally, the wireless network 100 may be any wireless network in which network areas restrict how many IP sessions can be established for a given mobile device. For example, in a Long Term Evolution (LTE) network, the Evolved Packet Core (EPC) provides IP connectivity to a mobile device through E-UTRAN. To provide such service, Evolved Packet System (EPS) bearers need to be established between the device and the PDN Gateway. A PDN connection is associated with an APN (or an IP address). When UE connects to a PDN, a "default" bearer is established, an IP address is assigned and remains established throughout the life-time of the PDN connection. Additional EPS bearers may be established for the same PDN and are known as "dedicated" bearers which share the same IP address.

Figure 1C:
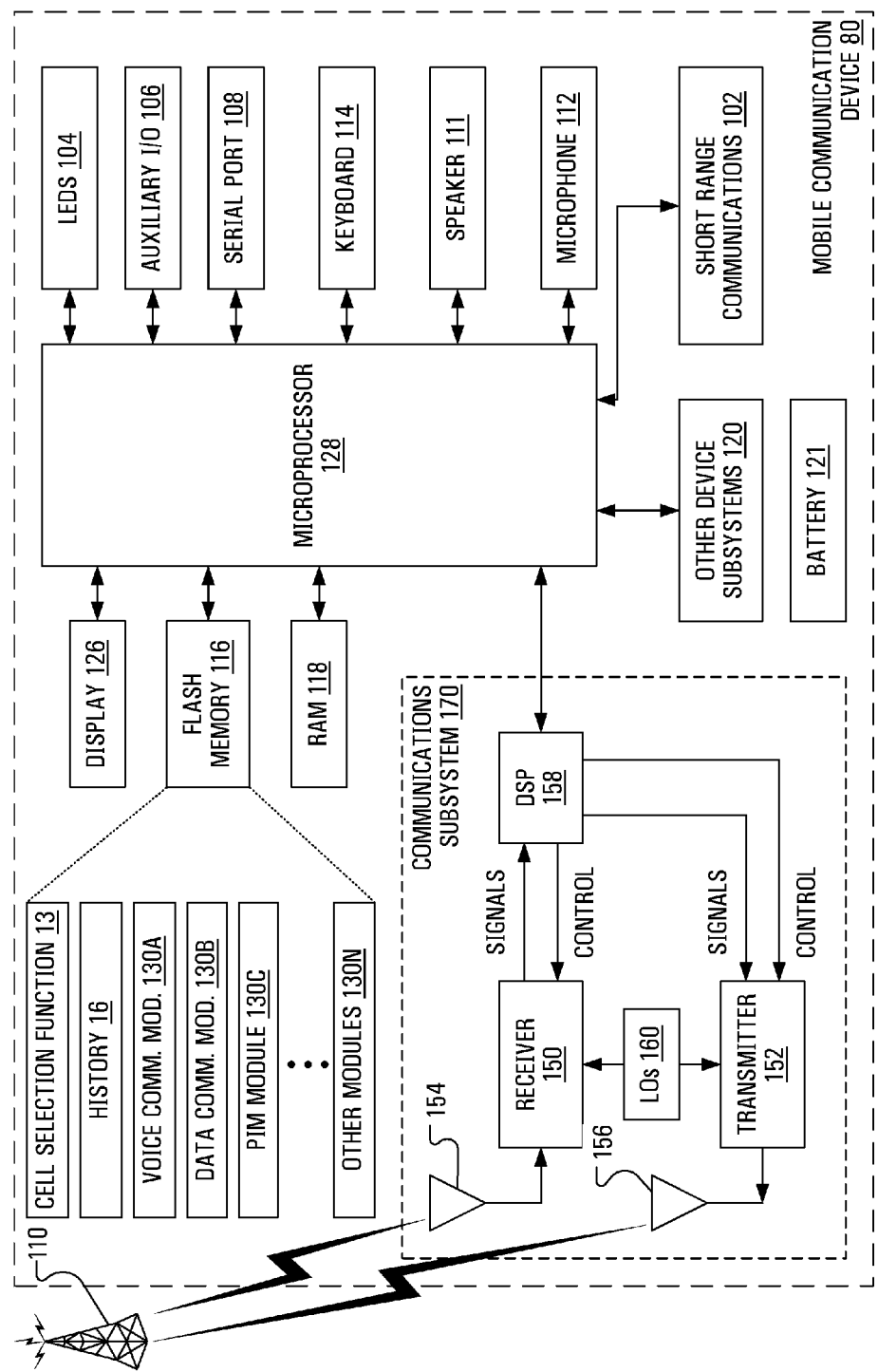
FIG. 1C is a block diagram of another mobile device.

There are many possibilities for the mobile device 10. Referring now to FIG. 1C, shown is a block diagram of another mobile device 80 that may implement any of the methods described herein. It is to be understood that the mobile device 80 is shown with very specific details for example purposes only.

A processing device (a microprocessor 128) is shown schematically as coupled between a keyboard 114 and a display 126. The microprocessor 128 controls operation of the display 126, as well as overall operation of the mobile device 80, in response to actuation of keys on the keyboard 114 by a user.

The mobile device 80 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 80 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 80 may have a battery 121 to power the active elements of the mobile device 80. The mobile device 80 is in some embodiments a two-way radio frequency (RF) communication device having voice and data communication capabilities. In addition, the mobile device 80 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 80 may also be stored to the RAM 118.

The microprocessor 128, in addition to its operating system functions, enables execution of software applications on the mobile device 80. A predetermined set of software applications that control basic device operations, such as a voice communications module 130A and a data communications module 130B, may be installed on the mobile device 80 during manufacture. In addition, a personal information manager (PIM) application module 130C may also be installed on the mobile device 80 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The mobile device 80 shown in FIG. 1C also includes a cell selection function 13 and a history 16, which are functionally equivalent to the cell selection function 13 and the history 16 that are included as part of the mobile device 10 shown in FIG. 1B.

Communication functions, including data and voice communications, are performed through the communication subsystem 170, and possibly through the short-range communications subsystem 170. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 80 is intended to operate. For example, the communication subsystem 170 of the mobile device 80 may be designed to operate with the Mobitex™, DataTAC™ or General Packet Radio Service (GPRS) mobile data communication networks and also designed to operate with any of a variety of voice/data communication networks, such as Advanced Mobile Phone Service (AMPS), Time Division Multiple Access (TDMA), Code Division Multiple Access (CDMA), Personal Communications Service (PCS), Global System for Mobile Communications (GSM), Universal Mobile Telcommunication Systems (UMTS), Long Term Evolution (LTE) etc. Other types of data and voice networks, both separate and integrated, may also be utilized with the mobile device 80.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 80 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 80. In addition, the display 126 may also be utilized in voice communication mode, for example, to display the identity of a calling party, the duration of a voice call, or other voice call related information.

The short-range communications subsystem 102 enables communication between the mobile device 80 and other proximate systems or devices, which need not necessarily be similar devices. For example, the short-range communications subsystem may include an infrared device and associated circuits and components, or a Bluetooth™ communication module to provide for communication with similarly-enabled systems and devices.

Method in a Mobile Device

Figure 2:
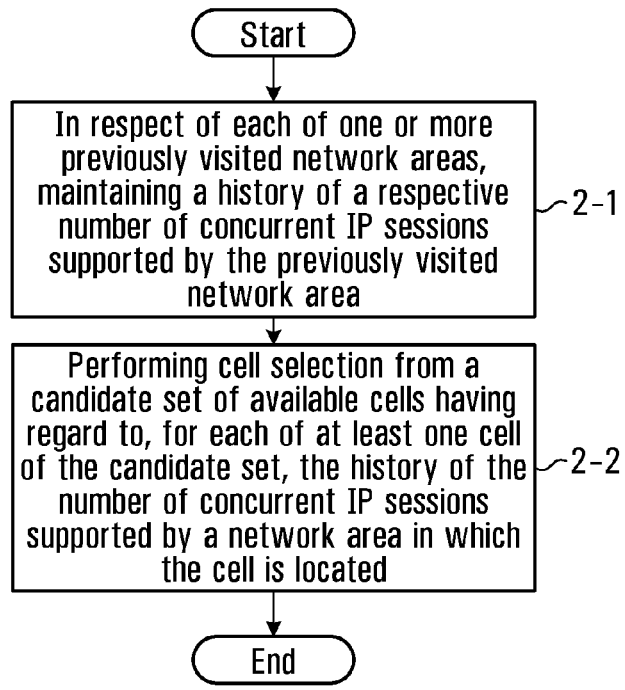
FIG. 2 is a flowchart of an example method of selecting a cell from a candidate set of cells having regard to a history of the number of IP sessions that are capable of being supported by network areas in which cells of the candidate set of cells are located.

Referring now to FIG. 2, shown is FIG. 2 is a flowchart of an example method of selecting a cell having regard to a history of the number of concurrent IP sessions that are capable of being supported by network areas in which one or more of the cells of the candidate set of cells are located. This method may be implemented in a mobile device, for example by the mobile device 10 shown in FIG. 1B, or by the mobile device 80 shown in FIG. 1C.

At block 2-1, the mobile device maintains, in respect of each of one or more previously visited network areas, a history of a respective number of concurrent IP sessions supported by the previously visited network area. Examples of how this history may be determined and maintained are provided later. More generally, the mobile device stores the number of IP sessions available to the mobile device for each of a number of network areas. Maintaining a history of a respective number of concurrent IP sessions supported by previously visited network areas is merely one example of an embodiment of the more general feature of storing of the number of IP sessions available to mobile device for each of a number of network areas.

At block 2-2, the mobile device performs cell selection from a candidate set of available cells having regard to, for each of at least one cell of the candidate set, the history of the number of simultaneous IP sessions supported by a network area of the one or more previously visited network areas in which the candidate cell is located. More generally, when the mobile device is in a location where two network areas overlap, the mobile device performs cell selection based on the stored number of IP sessions for each of the overlapping network areas. Performing cell selection from a candidate set of available cells having regard to, for each of at least one cell of the candidate set, the history of the number of simultaneous IP sessions supported by a network area of the one or more previously visited network areas in which the candidate cell is located, is merely one example of an embodiment of the more general feature of performing cell selection based on the stored number of IP sessions for each of the overlapping network areas.

In some implementations, performing cell selection in block 2-2 includes preferentially selecting a cell, from the candidate set of available cells, located in a network area which the history indicates is capable of supporting a higher number of concurrent IP sessions. More generally, in some embodiments performing cell selection in block 2-2 includes preferentially selecting a cell within one of the overlapping network areas that the stored number of IP sessions available to the mobile device for each of the overlapping network areas indicates is capable of supporting a higher number of concurrent IP sessions.

In some implementations, an event triggers cell selection. For example, in some implementations, cell selection is triggered upon receiving a request from an application for establishing a new IP session that would exceed the number of IP sessions capable of being supported by a current serving cell.

Powering on or starting-up the device are other examples of events that may trigger cell selection.

In some implementations, maintaining a history in block 2-1 includes, for a given network area for which a number of IP sessions capable of being supported by the given network area has not been determined, assuming a default value for the number of concurrent IP session capable of being supported by the given network area based on a maximum number of IP session that the mobile device is capable of supporting.

In some embodiments, performing cell selection in block 2-2 includes determining, based on the history maintained by the mobile device, if an available cell in the candidate set of available cells is capable of supporting a greater number of IP sessions than a currently serving cell, and if so, selecting the available cell as a new serving cell.

In some implementations, for a given network area, maintaining a history of a number of IP sessions supported by the given network area in block 2-1 includes attempting to establish simultaneous IP sessions with the given network area, receiving responses to such attempts and determining a number of IP sessions supported by the given network area on the basis of the attempts to establish IP sessions and the responses to such attempts.

Figure 3:
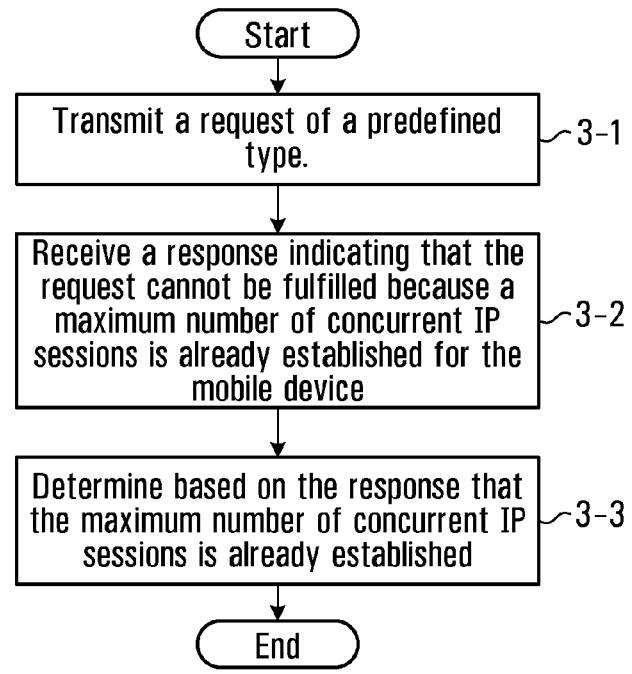
FIG. 3 is a flowchart of an example method of determining that the maximum number of IP sessions for a given network area is already established.

Referring now to FIG. 3, shown is a flowchart of an example method of determining that the maximum number of IP sessions is already established. In some implementations, once the mobile device has determined that a maximum number of IP sessions is established, the mobile device records the number of established IP sessions in its history.

At block 3-1, the mobile device transmits a request of a type that, if fulfilled, would result in an increase in the number of established IP sessions. The wireless network receives and processes the request. In this example, it is assumed that the wireless network cannot fulfill the request because a maximum number of IP sessions is already established for the mobile device. The wireless network transmits a response, which is received by the mobile device at block 3-2. The response indicates that the request cannot be fulfilled because the maximum number of concurrent IP sessions is already established for the mobile device. At block 3-3, the mobile device determines based on the response that the maximum number of concurrent IP sessions is already established.

There are many ways that the response can indicate that the request cannot be fulfilled because the maximum number of concurrent IP sessions is already established for the mobile device. In some implementations, the response includes a cause code indicating that the request cannot be fulfilled because the maximum number of IP sessions is already established for the mobile device. More generally, the response may include any appropriate indication that the request cannot be fulfilled because the maximum number of IP sessions is already established for the mobile device.

There are many possibilities for the type of request generated by the mobile device and the corresponding response from the network. In some implementations, the type of response depends on the type of request. Examples are provided below.

In one example, the request may be an Activate IP Session Request for requesting a new IP session to be established, while the response is an Activate IP Session Reject for rejecting the IP Session Request. In some implementations, the Activate IP Session Request is an Activate PDP context request while the response is an Activate PDP context Reject.

In another example, the request is an IP session Service Request for requesting service for an existing IP session, while the response is an IP Service Reject for rejecting the IP session Service Request. In some implementations, the IP session Service Request is a service request and the IP Service Reject is a Service Reject.

In another example, the request is an Activate PDP context request for requesting a new PDP context to be established, while the response is a PDP Deactivate Request from the network for deactivating an existing PDP context. This may occur for example if the mobile device transmits the Activate PDP context request in an area that does not support enough PDP contexts to fulfill the request. In this example, since a new PDP context is not initially established in response to the Activate PDP context request, the request is considered to be unfulfilled. However, in some implementations, after an existing PDP context is deactivated, the new PDP context that was requested becomes established.

In another example, the request is an RAU (routing area update) request for requesting to change to a new routing area, while the response is a mobile-terminated PDP Deactivate Request for deactivating an existing PDP context. This may occur for example if the mobile device transmits the RAU request after moving to a new routing area that does not support enough PDP contexts to fulfill the request. Other requests and corresponding responses are possible.

Example messages have been provided above for the response to the request. In some implementations, the messages are based on messages defined in 3GPP (3rd Generation Partnership Project) TS 24.008 V7.5.0 with appropriate modification for indicating that the request cannot be fulfilled because the maximum number of IP sessions is already established for the mobile device. Other implementations are possible.

In some implementations, the type of request depends on the state of the mobile device. For example, the type of request may vary depending on whether the mobile device is in the Idle State as compared with the Active/Connected State. In some implementations, the mobile device might transmit an IP Session Service Request message so as to request service for an existing IP Session while in the Active/Connected State. However, in some implementations, the mobile device never transmits an IP Session Service Request message while in the Idle State. In some implementations, requests of the predefined type are transmitted only while the mobile device is in the Active/Connected State. Other implementations are possible.

Figure 4:
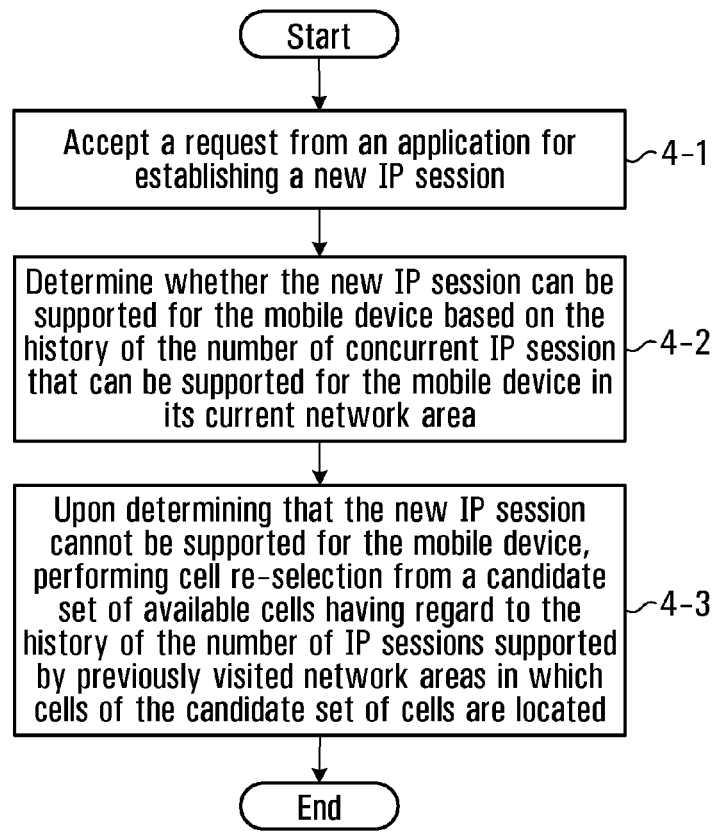
FIG. 4 is a flowchart of an example method of selecting a cell upon determining that a request for a establishing a new IP session cannot be accommodated by a current cell based on a history of the number of IP session supported by the network area in which the current cell is located.

Referring now to FIG. 4, FIG. 4 is a flowchart of an example method of selecting a cell upon determining that a request for a establishing a new IP session cannot be accommodated by a current network area.

At block 4-1, the mobile device accepts a request from an application for establishing a new IP session. For example, such a request may be generated by one of the applications 14 of the mobile device 10 shown in FIG. 1B.

At block 4-2, for a currently serving network area, the mobile device determines whether the new IP session can be supported for the mobile device by the currently serving network area based on the history of the number of concurrent IP sessions that can be supported for the mobile device.

At block 4-3, upon determining that the new IP session cannot be supported for the mobile device by the currently serving network area, the mobile device performing cell reselection from a candidate set of available cells having regard to the history of the number of concurrent IP sessions supported by network areas in which one or more of the candidate cells of the candidate set are located.

There are many ways for the mobile device to determine the number of concurrent IP sessions that can be supported. In some implementations, the manner in which the mobile device determines the number of concurrent IP sessions that can be supported depends on the type of request. For instance, if the request is an Activate PDP context request and the mobile device is aware of how many IP sessions are established prior to the request, then upon receiving a response indicating that the request cannot be fulfilled because the maximum number of concurrent IP sessions is already established, the mobile device might determine that the maximum number of concurrent IP sessions that can be supported is equal to how many concurrent IP sessions are established prior to the request. There are other possibilities for determining the maximum number of concurrent IP sessions that can be supported. Other examples are provided later with reference to FIG. 5.

Another Method in a Mobile Device

In a specific example of a method of establishing a PDP context, when a GPRS mobile phone sets up a PDP context, an Access Point Name (APN) is determined, and the access point is then used in a DNS query to a private DNS network. This process (called APN resolution) finally gives the IP address of the GGSN which should serve the access point. At this point a PDP context can be activated.

GPRS and UMTS networks have a limitation on the number of simultaneous PDP contexts that are supported. The number of PDP contexts may vary as a mobile device moves between differing parts of a network, or between different networks. Currently there is no information supplied to the mobile device to inform it of the number of concurrent PDP contexts supported. The result is that when a mobile device moves from a first area where there are enough PDP contexts supported to satisfy the mobile device's needs to a second area where there are not enough PDP contexts supported to satisfy the mobile device's needs, the network might drop one or more of the existing PDP contexts in an unpredictable manner. This problem is especially prevalent in UMTS networks as many only support one PDP context. In such networks, only one device function can have connectivity at a time and so always-on services such as push E-mail cannot operate simultaneously with WAP (wireless access point) surfing on a network's specific APN.

An event based method is provided for determining the number of PDP contexts in a given network area. A network area may be an entire network or part of a network. The following are specific examples of events that can occur when PDP contexts are activated one past the number supported:

PDP Deactivate Request from the network;

PDP Activate Reject from the network.

In some embodiments, cause codes within the messages are used to allow differentiation between deactivations and rejects for other legitimate reasons. When any of these events occurs with the correct cause code the number of active PDP contexts is counted and this is stored as watermark to the number of PDP contexts supported by the network. In some embodiments, steps to determine the number of supported PDP may be proactively done at startup (i.e. discovery) or in the background as different APNs are requested.

Figure 5:
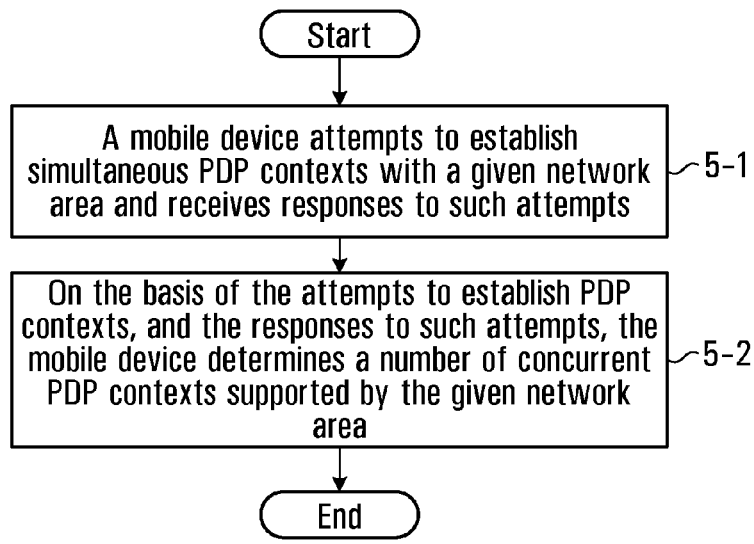
FIG. 5 is a flowchart of a method of determining the number of PDP contexts supported by a given network area.

Referring to FIG. 5, shown is a flowchart of a method of determining the number of simultaneously supported PDP contexts. This method may be implemented in a mobile device, for example by the mobile device 10 shown in FIG. 1B or by the mobile device 80 shown in FIG. 1C. At block 5-1, a mobile device attempts to establish simultaneous PDP contexts with a given network area and receives responses to such attempts. At block 5-2 on the basis of the attempts to establish PDP contexts, and the responses to such attempts, the mobile device determines a number of PDP contexts supported by the given network area.

In some embodiments, a default value for the number of PDP contexts supported by a network area is used that is based on capabilities of the wireless network. Such a default will also represent a maximum number of PDP contexts a network can support from the perspective of a given device. For example, if a given mobile device supports a maximum of 6 PDP contexts, then the default value initially is 6, and this will be reduced once the device attempts to establish that many simultaneous contexts unsuccessfully.

In some embodiments, establishing a number of PDP contexts supported by a given network area involves performing a count of how many simultaneous PDP contexts have been established. This can be done on an ongoing basis as new contexts are added. Alternatively, the count can be performed after one of the scenarios has occurred that indicates no more contexts are supported.

In some embodiments, determining the number of concurrent PDP contexts supported by the given network area involves looking for specific defined responses to attempts to establish a PDP context. In some implementations, once such a defined response is received, a conclusion is reached that the most recent attempt to establish a PDP context was an attempt to establish one more PDP context than is supported by the current network. As such, the number of PDP contexts supported by the given network area can be set to the number of simultaneous PDP contexts that have been established. This can involve looking at an ongoing count that was performed, or performing the count upon receiving the defined response.

The set of one or more defined responses that can trigger the above behavior is implementation specific. The following is a set of specific defined responses one or more of which might be implemented:

a PDP activate reject response with a cause value 26—Insufficient resources;

a PDP activate reject response with a cause value 31—Activation rejected, unspecified;

a PDP activate reject response with a cause value 32—Service option not supported;

a PDP activate reject response with a cause value 38—Network failure;

a PDP activate reject response with a cause value 111—Protocol error, unspecified;

a response requesting the deactivation of another existing context;

a response requesting the release of radio bearer associated with another existing context; and a response specifically configured to indicate that there are no more PDP contexts available.

In some cases, the above behavior may be triggered by receiving specific combinations of cause values on a deactivation request, for example 38—Network failure AND 39—Reactivation requested.

Figures 6, 7:
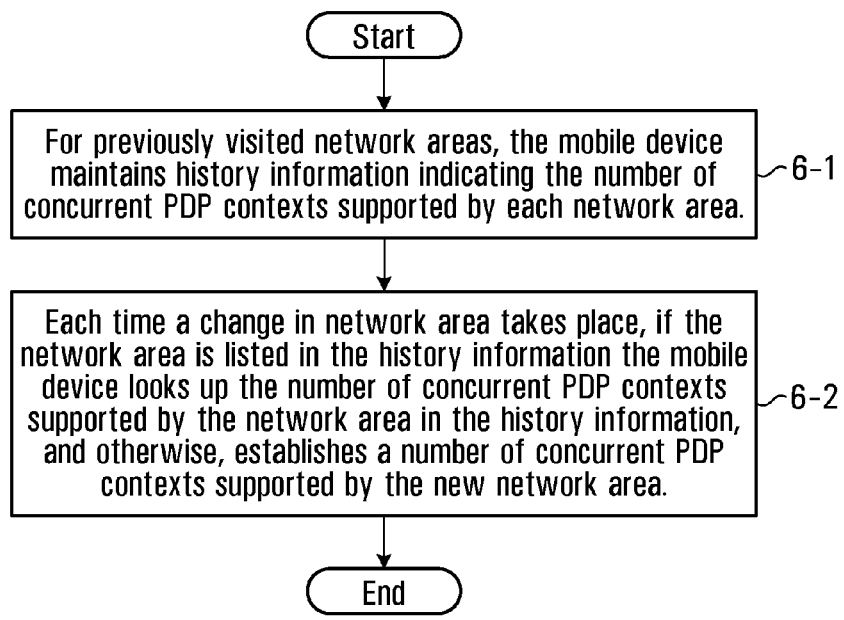
FIG. 6 is a flowchart of a method of maintaining history information.
FIG. 7 is a table of an example format in which the history information may be maintained.

Referring now to FIG. 6, shown is a flowchart of a method of maintaining history information. This method may be implemented in a mobile device, for example by the mobile device 10 shown in FIG. 1B or by the mobile device 80 shown in FIG. 1C. At block 6-1, for previously visited network areas, the mobile device maintains history information indicating the number of concurrent PDP contexts supported by each previously visited network area. At block 6-2, each time a change in network area takes place, if the network area is listed in the history information the mobile device looks up the number of PDP contexts supported by the network area in the history information, and otherwise, establishes a number of PDP contexts supported by the new network area.

Referring now to FIG. 7, shown is a table 200 of an example format in which the history information may be maintained. The table 200 has a first column 202 for storing network area identifiers, and a second column 204 for storing the number of PDP contexts supported. A generic entry for the table is indicated at 206. The context support information can be maintained to a network area granularity defined on an implementation specific basis. In some embodiments, the granularity is to that of PLMN identifier, and an example record is indicated at 208; in some embodiments the granularity is to that of combined PLMN and LAC (local area code), and an example record is indicated at 210; in some embodiments the granularity is to that of combined RAC (routing area code) and RNC ID and an example record is indicated at 212; in some embodiments the granularity is to that of combined, PLMN, LAC and cell identifier and an example record is indicated at 214. Other granularities can alternatively be used. The granularity need not be consistent across all network areas. Maintaining the history to the granularity of PLMN, LAC and cell identifier, or some other identifier by which an individual cell or subset of cells can be uniquely identified within a wider network area, can potentially be useful in situations where, for example, one or more cells associated with a combined PLMN and LAC are capable of supporting a different number of IP sessions (e.g. PDP contexts), than one or more other cells that are also associated with the combined PLMN and LAC. An example of such a situation might arise in a scenario where a femtocell is located within the coverage area of a macrocell that is capable of supporting a different number of concurrent IP sessions than the femtocell.

Cell Selection

Two examples of cell selection in accordance with embodiments of the present disclosure will now be described with reference to FIGS. 8 and 9. As used herein, the term "cell selection" is used to describe both the process of selecting a cell when a mobile device is not currently "camped" on a network cell and the process of reselecting a new cell when the mobile device is "camped" on a current network cell. In some embodiments, this latter process of reselecting a new cell may be triggered when an RF signal parameter associated with the current serving cell fails to satisfy a RF signal parameter criteria, such as RSSI, and/or when a new IP session is requested that could not be concurrently supported by the current serving cell.

Figure 8:
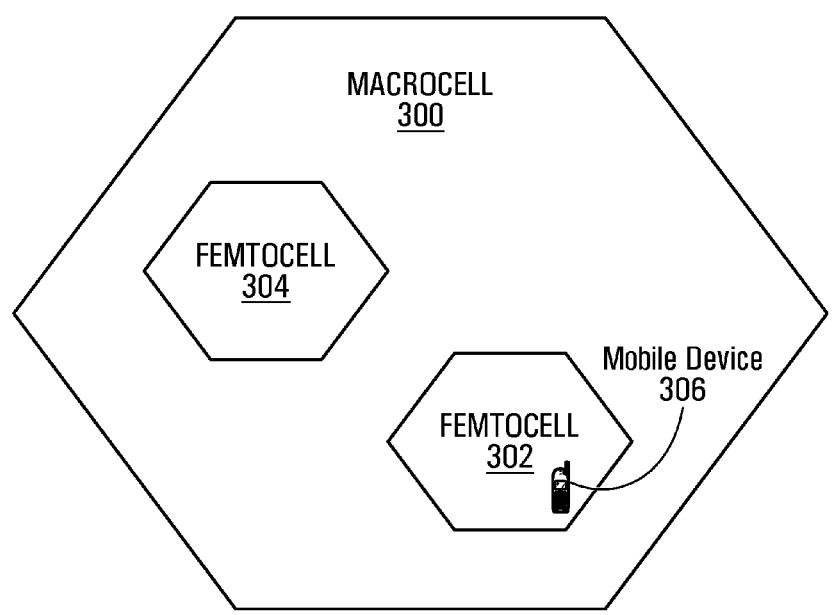
FIG. 8 is a block diagram of an example wireless system featuring a macrocell, two femtocell and a mobile device.
Figure 9:
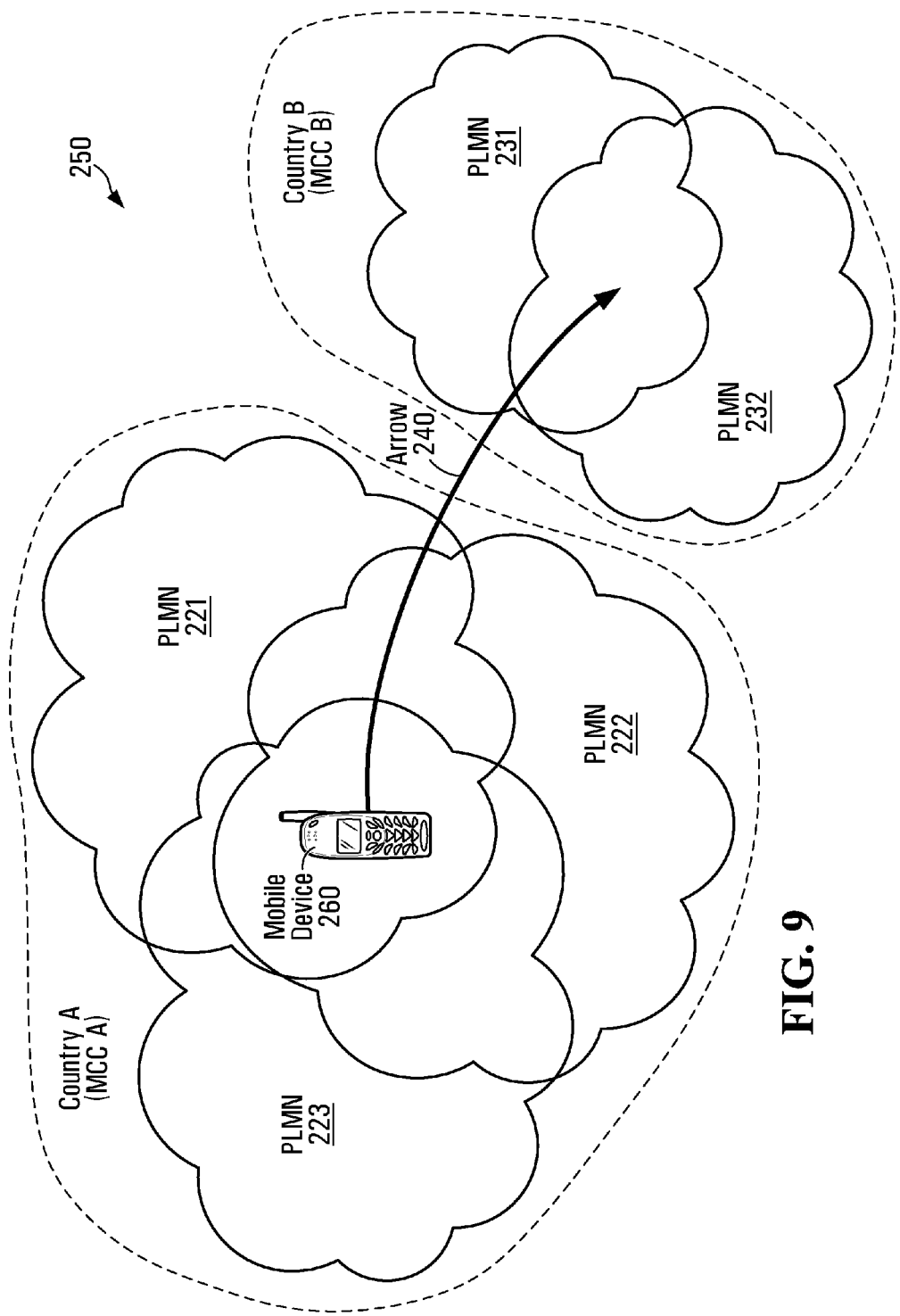
FIG. 9 is a block diagram of an example wireless system featuring a mobile device and a plurality of wireless networks.

The following examples of cell selection described with reference to FIGS. 8 and 9 are provided for illustrative purposes only and should not be construed as limiting.

FIG. 8 is a block diagram of an example wireless system featuring a macrocell 300, two femtocells 302,304 and a mobile device 306. Only a single mobile device is depicted in FIG. 8 for the sake of simplicity. More generally, any number of mobile device may be included in a wireless system in accordance with the present disclosure. Furthermore, the inclusion of two femtocells in the illustrated example is likewise for the sake of simplicity, as other embodiments may include any number of femtocells within the coverage area of a macrocell. Other embodiments do not include any femtocells.

In the block diagram of FIG. 8, femtocells 302 and 304 are within the coverage area of macrocell 300 and mobile device 306 is within the coverage area of femtocell 302, and hence is also within the coverage area of macrocell 300. For illustrative purposes, it is assumed that macrocell 300 is identified by PLMN identifier, PLMN A, Location Area Code, LAC A, and a Cell ID, Cell A. It is also assumed that femtocell 302 is identified by PLMN identifier, PLMN A, Location Area Code, LAC A, and a Cell ID, Cell B, whereas it is assumed that femtocell 304 is identified by PLMN identifier, PLMN A, Location Area Code, LAC A, and a Cell ID, Cell C. That is, it is assumed that Cell IDs Cell A, Cell B and Cell C uniquely identify macrocell 300, femtocell 302 and femtocell 304 within a wider network area identified by PLMN A and LAC A.

As noted above, in the instant depicted in FIG. 8, the mobile device 306 is located within the coverage areas of both macrocell 300 and femtocell 302. For illustrative purposes, it is assumed that mobile device 306 has previously determined a number of IP sessions that can be concurrently supported by macrocell 300, femtocell 302 and femtocell 304. For the sake of this example, it is assumed that mobile device 306 maintains a history of the number of IP sessions that can be concurrently supported in a table, such as that shown in Table A below.

TABLE A

| Network Area Identifier | Number of IP Sessions Supported |
|---|---|
| PLMN A, LAC A, Cell A | 3 |
| PLMN A, LAC A, Cell B | 1 |
| PLMN A, LAC A, Cell C | 2 |

With reference to Table A, it can be seen that for the sake of this example it is assumed that macrocell 300, which is identified by PLMN identifier=PLMN A, LAC=LAC A and Cell ID=Cell A, is capable of concurrently supporting 3 IP sessions, while it is assumed that femtocells 302 and 304, which in combination with PLMN identifier=PLMN A and LAC=LAC A are identified by Cell ID=Cell B and Cell C respectively, are capable of concurrently supporting 1 and 2 IP sessions respectively. Given that mobile device 306 is within the coverage areas of both femtocell 302 and macrocell 300, assuming that both femtocell 302 and macrocell 300 meet a RF signal parameter criteria, such as a minimum RSSI, then both femtocell 302 and macrocell 300 may be included in a candidate set of cells available to serve mobile device 306.

It is assumed that at the instant depicted in FIG. 8 mobile device 306 is currently "camped" on femtocell 302 with one active IP session. In some embodiments, in the event that an application on mobile device 306 requests establishment of an additional concurrent IP session, which the history shown in Table A indicates cannot be concurrently supported by femtocell 302, then mobile device 306, having regard to the history of the number of concurrent IP sessions supported by network areas in which one or more of the cells of the candidate set of cells are located, reselects to macrocell 300 in order to establish the additional IP session. In some embodiments, once the additional IP session is complete and mobile device 306 no longer has two concurrently active IP sessions, assuming that mobile device 306 remains with the coverage area of femtocell 302, then mobile device 306 may reselect back to femtocell 302 based on other cell selection parameters, such as RF signal parameter criteria.

In general, a mobile device selects a cell from its candidate set of available cells only if the cell meets a RF signal parameter criteria for service of the mobile device. In some embodiments, a cell is included in the candidate set of cells only if the cell meets a minimum RF signal parameter criteria. In some embodiments, a mobile device reselects to a different cell from a currently serving cell if the history of supportable concurrent IP sessions indicates that the different cell is capable of supporting a number of currently active IP sessions and the different cell has a better RF signal parameter than the currently serving cell. As an illustrative example, assume that mobile device 306 reselects to macrocell 300, establishes two active IP sessions, as described above, and then moves within the coverage area of femtocell 304. In some embodiments, if femtocell 304, which the history maintained by mobile device 306 indicates is capable of supporting two concurrent IP sessions, has a better RF signal parameter, such as a higher RSSI, than that of macrocell 300 and/or if mobile device 306 has a record that shows a preference for femtocell 304 over macrocell 300, then, in some embodiments, mobile device 306, having regard to the fact that the history indicates that femtocell 304 is capable of supporting the two active IP sessions, reselects to femtocell 304. In some embodiments, even though femtocell 304 is capable of supporting the two active IP sessions, because macrocell 300 is capable of supporting a greater number of concurrent IP sessions than femtocell 304 is capable of supporting, mobile device 306 does not automatically reselect to femtocell 304, even though the history indicates that femtocell 304 is capable of supporting a current number of active IP sessions.

FIG. 9 is a block diagram of an example wireless system 250 featuring a mobile device 260 and a plurality of wireless networks PLMN 221, PLMN 222, PLMN 223, PLMN 231 and PLMN 233. Wireless networks PLMN 221, PLMN 222 and PLMN 223 are located in Country A identified by mobile country code MCC A, while wireless networks PLMN 231 and PLMN 232 are located in Country B identified by mobile country code MCC B. For illustrative purposes, it is assumed that the wireless networks are identified by a PLMN identifier that is a combination of a mobile country code and a mobile network code such that: PLMN 221 is identified by MCC A, MNC A; PLMN 222 is identified by MCC A, MNC B; PLMN 223 is identified by MCC A, MNC C; PLMN 231 is identified by MCC B, MNC A; and PLMN 233 is identified by MCC B, MNC B.

At the instant depicted in FIG. 9, mobile device 260 is located in an area overlapping coverage from wireless networks PLMN 221, PLMN 222 and PLMN 223 in Country A. For illustrative purposes it is assumed that for each of wireless networks PLMN 221, PLMN 222 and PLMN 223, mobile device 260 has determined a number of concurrent IP sessions that can be supported by the wireless network. For the sake of this example it is assumed that mobile device 260 has determined that PLMN 221 is capable of supporting 2 concurrent IP sessions, and PLMNs 222 and 223 are each capable of supporting 3 concurrent IP sessions, which may be maintained in a memory on mobile device 260 in a table format, such as that shown in Table B. It is assumed that mobile device 260 has not yet determined a number of concurrent IP sessions that can be supported by wireless networks PLMN 231 and PLMN 232 in Country B.

TABLE B

| Network Area Identifier | Number of IP Sessions Supported |
| --- | --- |
| PLMN identifier = MCC A, MNC A | 2 |
| PLMN identifier = MCC A, MNC B | 3 |
| PLMN identifier = MCC A, MNC C | 3 |

In this example, it is assumed that mobile device 260 is "camped" on PLMN 221 and has two active IP session. It is further assumed that all of the cells that are part of a wireless network identified by a PLMN identifier are capable of supporting the same number of concurrent IP sessions. That is, it is assumed that all cells associated with a PLMN identifier are capable of supporting the number of concurrent IP sessions associated with the PLMN identifier in the history maintained by the mobile device. This is reflected in the fact that the history indicated in Table B is maintained at a granularity of PLMN identifier, as opposed to, for example, the history indicated in Table A, which is maintained to a granularity of PLMN identifier, LAC and cell identifier.

In some embodiments, cell selection is triggered if an application on mobile device 260 requests the establishment of an IP session that cannot be supported by a currently serving network area. For example, cell selection may be triggered if, while mobile device is "camped" on wireless network 221 with two active IP sessions, an application on mobile device 260 requests establishment of a third IP session. In which case, mobile device 260 would perform cell selection having regard to the history of concurrently supported IP sessions of network areas in which cells that are included in a candidate set of available cells are located. Because mobile device 260 is located within an area of overlapping coverage from wireless networks PLMN 221, PLMN 222 and PLMN 223, a candidate set of available cells that are capable of serving mobile device 260 may include cells from each of wireless networks PLMN 221, PLMN 222 and PLMN 223. As such, in some embodiments, mobile device may reselect to a cell in PLMN 222 or PLMN 223, which the history shown in Table B indicates are capable of supporting three concurrent IP sessions. The selection between PLMN 222 and PLMN 223 may be based, for example, on a RF signal parameter, such as received signal strength of a cell within the network, or some other network selection parameter.

In some cases, a network operator of the home network of a mobile device may have some means by which a preference for one wireless network over another is conveyed to the mobile device.

In some embodiments, preferred networks identified by a record, such as a preferred roaming list, stored in the memory of a mobile device may take precedence, even if another available network is capable of supporting a greater number of concurrent IP sessions. For example, with reference to FIG. 9 again, if mobile device 260 moves to an area of overlapping coverage from wireless networks PLMN 231 and PLMN 232 in Country B, as indicated by arrow 240 in FIG. 9, in some embodiments when mobile device 260 is switched on cell selection will be triggered. For illustrative purposes, it is assumed that when mobile device 260 is switched on in Country B the mobile device determines that PLMN 231 and PLMN 232 are capable of supporting two and three concurrent IP sessions respectively. In some embodiments, mobile device 260 may then preferentially select PLMN 232 over 231 having regard to the greater number of IP sessions that could potentially be supported by PLMN 232. In some embodiments, the history maintained by mobile device is updated as shown in Table C.

TABLE C

| Network Area Identifier | Number of IP Sessions Supported |
| --- | --- |
| PLMN identifier = MCC A, MNC A | 2 |
| PLMN identifier = MCC A, MNC B | 3 |
| PLMN identifier = MCC A, MNC C | 3 |
| PLMN identifier = MCC B, MNC A | 2 |
| PLMN identifier = MCC B, MNC B | 3 |

If the network operator of the home network of mobile device 306 has a preferred roaming agreement with PLMN 231, as indicated, for example, by a preferred roaming list stored in a SIM module of mobile device 260, then mobile device 260 may not select a cell in PLMN 232 over a cell in PLMN 231, even if an application on mobile device 260 requests establishment of an additional IP session that cannot be supported by PLMN 231. In some embodiments, mobile device 260 is able to reselect to a cell in PLMN 232 from a cell in PLMN 231 in order to, for example, establish a third concurrent IP session, even if PLMN 231 is ranked more highly than PLMN 232 as a preferred roaming network.

The above-summarized methods may find application in intra-RAT (radio access technology) scenarios (e.g. with WCDMA/UMTS networks) as well as in inter-RAT scenarios such as GPRS to UMTS handover.

The description above has assumed that it is the number of supported simultaneous PDP contexts that is to be determined, and then cell selection is performed having regard to the number of supported simultaneous PDP contexts provided by available network areas in some implementations. More generally, a similar approach can be used to determine the number of supported simultaneous IP sessions, a PDP context being a specific example of an IP session.

IP Sessions

In the examples presented above, references are made to IP sessions. It is to be understood that there are many possibilities for the IP sessions. The IP sessions may for example include any of an Always-On IP session, an IM (Instant Messaging) IP session, a WAP (Wireless Application Protocol) IP session, an MMS (Multimedia Messaging Service) IP session, a DUN (Dial-Up Networking) IP session, an LBS (Location Based Services) IP session, IP Modem IP session, and a PTT (Push-to-Talk) IP session. The nature of the IP sessions is implementation specific and typically depends on the wireless network. In some implementations, the wireless network is a UMTS network and each IP session is part of a respective PDP (Packet Data Protocol) context.

Numerous modifications and variations of the present application are possible in light of the above teachings. It is therefore to be understood that within the scope of the appended claims, the application may be practised otherwise than as specifically described herein.

We claim:

1. A method in a mobile device comprising:
   storing a number of concurrent IP (Internet protocol) sessions available to the mobile device for each of a number of network areas; and
   when the mobile device is in a location where two of the network areas overlap, performing cell selection between a first network area of the two network areas that overlap and a second network area of the two network areas that overlap based on the stored number of concurrent IP sessions available for each of the two network areas that overlap;
   wherein performing cell selection comprises:
   determining, based on the stored number of concurrent IP sessions available to the mobile device for each of the two network areas that overlap, if a greater number of concurrent IP sessions is available to the mobile device in an available cell than in a currently serving cell, and if so, selecting the available cell as a new serving cell;
   wherein, upon an event triggering cell selection, the cell selection function is configured to:
   identify a candidate set of available cells based on an RF (Radio Frequency) signal parameter criteria; and
   perform cell selection having regard to, for each of at least one cell in the candidate set, an RF signal parameter of the cell and the stored number of concurrent IP sessions available to the mobile device for the network area in which the cell is located;
   wherein the cell selection function is configured to perform cell selection upon acceptance of a request from an application for establishing a new concurrent IP session that would exceed the maximum number of concurrent IP sessions available to the mobile device by a current serving cell.

2. The method of claim 1, wherein:
   storing the number of concurrent IP sessions available to the mobile device for each of a number of network areas comprises maintaining a history of a respective number of concurrent IP sessions supported by a number of previously visited network areas.

3. The method of claim 2, wherein, for a given network area, maintaining a history of a number of concurrent IP sessions supported by the given network area comprises:
   attempting to establish simultaneous concurrent IP sessions with the given network area;
   receiving responses to such attempts; and
   determining a number of concurrent IP sessions supported by the given network area based on the attempts to establish concurrent IP sessions and the responses to such attempts.

4. The method of claim 1, wherein performing cell selection comprises:
   preferentially selecting a cell within a one of the two network areas that overlap for which the stored number of concurrent IP sessions available to the mobile device availability of a higher number of concurrent IP sessions than is available in a remaining one of the two network areas that overlap.

5. The method of claim 1, further comprising:
   upon an event triggering cell selection, identifying a candidate set of available cells having regard to an RF (Radio Frequency) signal parameter criteria, wherein cell selection is performed having regard to the RF signal parameter associated with an available cell in the candidate set of available cells and the stored number of concurrent IP sessions available to the mobile device for the network area in which the available cell is located.

6. The method of claim 5, further comprising triggering cell selection upon receiving a request from an application for establishing a new concurrent IP session that would exceed a number of concurrent IP sessions capable of being supported by a currently serving cell.

7. The method of claim 5, further comprising triggering cell selection upon start-up of the mobile device.

8. The method of claim 1, wherein for a given network area for which a number of concurrent IP sessions available to the mobile device has not been determined, assuming a default value for the number of concurrent IP sessions available to the mobile device for the given network area based on a maximum number of concurrent IP session that the mobile device is capable of supporting.

9. The method of claim 1, wherein storing the number of concurrent IP sessions available to the mobile device for each of a number of network areas comprises maintaining a history of a respective number of concurrent PDP (Packet Data Protocol) contexts supported by previously visited network areas.

10. The method of claim 1, wherein the stored number of concurrent IP sessions available to the mobile device for each of a number of network areas identifies the network areas to a granularity of at least one of:
    PLMN (Public Land Mobile Network) identifier;
    PLMN identifier and LAC (location area code);
    RAC (Routing Area Code) and RNC ID (Radio Network Controller Identifier);

PLMN identifier, LAC and Cell ID;
sets of cells; and
individual cells.

11. A mobile device comprising:
at least one antenna;
a wireless access radio functionally connected to the at least one antenna;
a memory for storing a number of concurrent IP sessions available to the mobile device for each of a number of network areas;
a cell selection function functionally connected to the memory, the cell selection function configured to:
when the mobile device is in a location where two of the network areas overlap, perform cell selection between a first network area of the two network areas that overlap and a second network area of the two network areas that overlap based on the stored number of concurrent IP sessions available for each of the two network areas that overlap;
wherein performing cell selection comprises:
determining, based on the stored number of concurrent IP sessions available to the mobile device for each of the two network areas that overlap, if a greater number of concurrent IP sessions is available to the mobile device in an available cell than in a currently serving cell, and if so, selecting the available cell as a new serving cell;
wherein, upon an event triggering cell selection, the cell selection function is configured to:
identify a candidate set of available cells based on an RF (Radio Frequency) signal parameter criteria; and
perform cell selection having regard to, for each of at least one cell in the candidate set, an RF signal parameter of the cell and the stored number of concurrent IP sessions available to the mobile device for the network area in which the cell is located;
wherein the cell selection function is configured to perform cell selection upon acceptance of a request from an application for establishing a new concurrent IP session that would exceed the maximum number of concurrent IP sessions available to the mobile device by a current serving cell.

12. The mobile device of claim 11, wherein the cell selection function is configured to store the number of concurrent IP sessions available to the mobile device for each of a number of network areas in the memory by maintaining a history in the memory of a respective number of concurrent IP sessions supported by a number of previously visited network areas.

13. The mobile device of claim 12, wherein the cell selection function is configured to maintain a history of a number of concurrent IP sessions supported by a given network area in the memory by:
attempting to establish simultaneous concurrent IP sessions with the given network area;
receiving responses to such attempts;
determining a number of concurrent IP sessions supported by the given network area on the basis of the attempts to establish concurrent IP sessions and the responses to such attempts; and
storing the determined number of concurrent IP sessions supported by the given network area in the memory.

14. The mobile device of claim 11, wherein the cell selection function is configured to preferentially select a cell within a one of the two network areas that overlap for which the stored number of concurrent IP sessions available availability of a higher number of concurrent IP sessions than is available in a remaining one of the two network ones that overlap.

15. The mobile device of claim 11, wherein the cell selection function is configured to perform cell selection at start-up of the mobile device.

16. The mobile device of claim 11, wherein the number of concurrent IP sessions available to the mobile device for each of a number of network areas stored in the memory comprises a history of a respective number of concurrent PDP (Packet Data Protocol) contexts supported by previously visited network areas.

17. The mobile device of claim 11, wherein the number of concurrent IP sessions available to the mobile device for each of a number of network areas stored in the memory of the mobile device identifies the network areas to a granularity of at least one of:
PLMN (Public Land Mobile Network) identifier;
PLMN identifier and LAC (Location Area Code);
RAC (Routing Area Code) and RNC ID (Radio Network Controller Identifier);
PLMN identifier, LAC and Cell ID;
sets of cells; and
individual cells.

18. The mobile device of claim 11, wherein the cell selection function is further configured to:
determine, based on the number of concurrent IP sessions available to the mobile device for each of the two network areas that overlap stored in the memory of the mobile device, if a greater number of concurrent IP sessions is available to the mobile device in an available cell than in a currently serving cell; and
if so, select the available cell as a new serving cell.

19. A non-transitory computer readable medium having computer executable instructions stored thereon for execution on a mobile device so as to implement a method comprising:
storing a number of concurrent IP (Internet protocol) sessions available to the mobile device for each of a number of network areas; and
when the mobile device is in a location where two of the network areas overlap, performing cell selection between a first network area of the two network areas that overlap and a second network area of the two network areas that overlap based on the stored number of concurrent IP sessions available for each of the two network areas that overlap;
wherein performing cell selection comprises:
determining, based on the stored number of concurrent IP sessions available to the mobile device for each of the two network areas that overlap, if a greater number of concurrent IP sessions is available to the mobile device in an available cell than in a currently serving cell, and if so, selecting the available cell as a new serving cell;
wherein, upon an event triggering cell selection, the cell selection function is configured to:
identify a candidate set of available cells based on an RF (Radio Frequency) signal parameter criteria; and
perform cell selection having regard to, for each of at least one cell in the candidate set, an RF signal parameter of the cell and the stored number of concurrent IP sessions available to the mobile device for the network area in which the cell is located;
wherein the cell selection function is configured to perform cell selection upon acceptance of a request from an application for establishing a new concurrent IP session that would exceed the maximum number of concurrent IP sessions available to the mobile device by a current serving cell.

* * * * *